Sept. 25, 1951 D. B. BRADNER ET AL 2,569,368
JOINING METAL PARTS
Filed Jan. 8, 1946
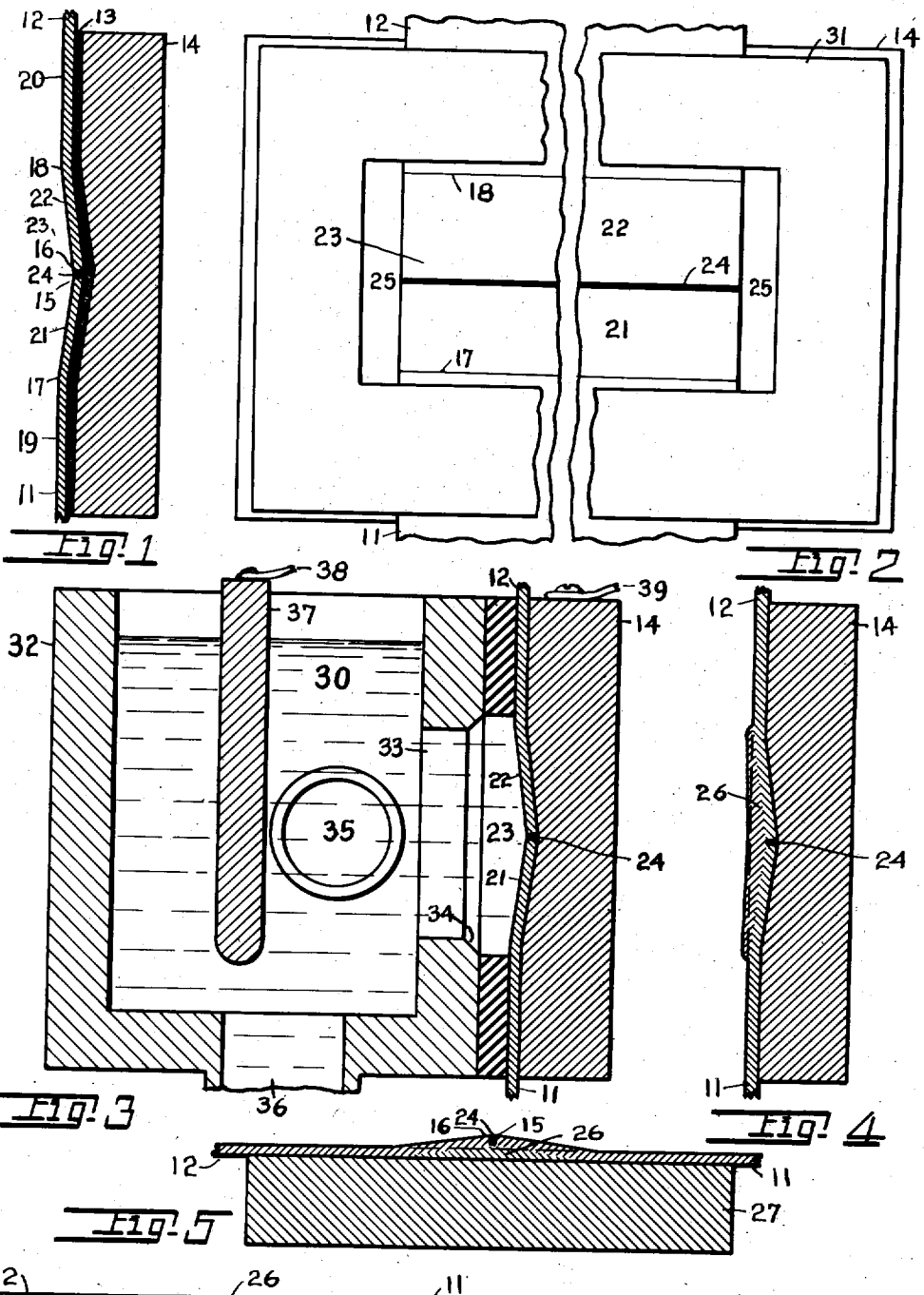
INVENTORS
Donald B. Bradner
William B. Stoddard Jr.
BY Philip S. Blickensderfer
Frederick G. L. Boyer ATTORNEY Patented Sept. 25, 1951

2,569,368

UNITED STATES PATENT OFFICE 2,569,368

JOINING METAL PARTS

Donald B. Bradner, Washington, D. C., and William B. Stoddard, Jr., and Philip S. Blickensderfer, Hamilton, Ohio, assignors to The Champion Paper and Fibre Company, Hamilton, Ohio, a corporation of Ohio Application January 8, 1946, Serial No. 639,867

17 Claims. (Cl. 204—16)

This invention relates to the art of joining metal parts by a metallic bond which is integral with the parts joined thereby, and is particularly concerned with the joining of the edges of metal sheets to form more extensive sheets.

One major object of the present invention is to provide sheet metal structures, requiring one or more seams, particularly those in which the metal is in its harder and stronger forms, wherein the physical properties of the metal are nearly uniform throughout, being substantially the same in and adjacent the seams as in other parts of the structure. A further object of the invention is to provide such structures of sheet nickel having tensile strength of at least 80,000 pounds per square inch throughout. Another major object of the invention is to provide a low temperature welding process whereby metal sheets can be joined without altering the physical properties of the metal near the weld. An allied object is to provide such a welding process wherein sheets of metal even in its harder and stronger forms can be joined by a weld having physical properties substantially equal to those of the sheets joined thereby. A further object is to provide such a welding process which can be accomplished by electrolytic means. Other objects and advantages of the invention will be apparent from the following description.

The invention which makes possible the accomplishment of these objects is herein disclosed as embodied in the joining of edges of electrolytically formed sheet nickel having a tensile strength in excess of 100,000 pounds per square inch and will be more particularly described with reference to the accompanying drawing, in which:

Fig. 1 is a cross sectional view showing the edges of thin sheet metal parts abutted and mounted ready to be joined together by an electrolytic welding operation in accordance with the present invention.

Fig. 2 is a plan view of the parts shown in section in Fig. 1, with the rubber gasket used for mounting the parts in the electrolytic cell in place thereover.

Fig. 3 is a cross sectional view, showing the parts illustrated in Figs. 1 and 2, as mounted in an electrolytic cell ready for the welding operation.

Fig. 4 is a cross sectional view of the parts illustrated in Fig. 1 after the completion of the welding operation but before their removal from their rigid support.

Fig. 5 is a similar sectional view showing the completed weld after being dressed down on one side, mounted on a rigid support preparatory to dressing down the other side.

Fig. 6 is a sectional view to a somewhat larger scale showing the completed weld joining the sheet metal parts into a substantially homogeneous structure of substantially uniform thickness and physical properties throughout.

Referring to Fig. 1, the edge portions of the metal sheets or strips 11 and 12 which are to be electrolytically welded together should be firmly held, during welding, in the relative positions they are to occupy in the finished joint. For this purpose they are rigidly fastened to a relatively heavy and inflexible metal block or bar 14 by suitable clamping devices, not shown, or by cementing or soldering. In the cementing or soldering operation the combination of good adhesion and the desired parallelism of the sheets 11 and 12 with the surface of bar 14 can in many cases be most easily secured by interposing a recticular member such as wire cloth 13 (Fig. 1), with the solder or other cementing medium between sheets 11, 12, and bar 14 which are then held together under high pressure while the cementing medium solidifies. (The terms "cementing medium" and "cementing" are herein used to include solder and soldering.) Otherwise parts 11 and 12 may be secured to block 14 by any other method suitable to the specific occasion. The method of soldering or cementing by use of an interposed reticular member, is the invention of but one of the present inventors and is accordingly not specifically claimed herein, but is the subject of a co-pending, concurrently filed application Serial No. 639,868, now Patent No. 2,530,552.

The fastening method to be used should be chosen with due regard to the characteristics of the metal of which parts 11 and 12 are formed. The dimensions and properties of high tensile electrolytic nickel may be permanently altered by heating to temperatures over about 350° or 400° F. so that, working with this material, it may be desirable to use a cementing medium having a fusing point below that temperature, or to heat treat the parts throughout at the cementing temperature.

On order to secure a sound weld of the full thickness of the sheet with the required degree of adherence between weld metal and the sheets 11 and 12, we have found it desirable that the edges 15 and 16 respectively of sheets 11 and 12 be completely displaced from the plane of the sheets, by bending the sheets slightly as at 17 and 18 along lines parallel to and at a short distance from the edges 15 and 16 respectively. Portions 19 and 20 of the sheets 11 and 12 which lie beyond the bends 17 and 18 are held accurately in the same plane while portions 21 and 22 are slightly inclined to this plane and form a depression or trough designated generally by the numeral 23, for the reception of weld metal.

The term "plane of the sheet" is to be understood to mean the entire space enclosed between the opposite surfaces of the sheets, or other parts being joined, as continued across the space between them, when in the relative positions they are to occupy after welding, but disregarding any portions bent out of their normal plane in preparation for the welding process as described herein.

We have found that to make possible the formation of a sound weld, the space between the abutted edges 15 and 16 must be completely filled with an electrical conductor 24, that this conductor must be flush with or smoothly join the surface of the sheets, and that there must be no cracks, pits, crevices, or surface discontinuities of any sort either in the conductor itself or where it joins the sheets 11 and 12. Solder may, if desired, be used as the conductor 24. Even if the solder melts at a temperature higher than that allowable for fastening sheets 11, 12 to bar 14, it is not necessarily harmful provided the width of the space to be filled is small, since it is then not necessary to overheat any material area of the sheets; and any parts which may have been overheated lie completely outside of the plane of the sheets where they will be removed after deposition of the weld metal. Care must be taken to remove from the surfaces 21, 22 of the nickel sheets any solder which may have been smeared thereon in smoothing and levelling the surface of the solder filling 24. Alternatively, other conductors (e. g. a graphite impregnated phenolic varnish or a graphite covered wax) may be used to fill the space at 24. The same precautions against fouling the surfaces 21, 22 of sheets 11, 12 should be observed with these conductors as with solder.

Areas 25 (Fig. 2) of bar 14, which are exposed at each side of the sheets, are advantageously covered with the same conductor used to fill the space 24, in order to prevent plating directly onto the bar 14.

In order to form a welded structure with substantially uniform physical properties throughout, it is necessary that the strength of adherence of the electrodeposited metal to the base metal be substantially equal to the strength of the base metal itself. This means an entirely different order of adherence from that required or generally secured in the usual electroplating operations. In order to secure the required degree of adherence to a nickel base, especially in the presence of solder as at 24 and 25, it is necessary that the nickel surface be especially prepared for the reception of a strongly adherent deposit. Nickel, in the presence of solder, can be simultaneously protected from the poisoning effect of the solder and prepared for the reception of a strongly adherent electrodeposit by, after a usual alkaline cleaning and rinsing, anodically treating the combined nickel-solder surface in a concentrated solution of sulphuric and phosphoric acids, using, for example, nickel or lead cathodes. The solution should contain not over about 60% water and advantageously $\frac{1}{3}$ to $\frac{1}{2}$ as much phosphoric as sulphuric acid. It is preferably used at temperatures somewhat above room temperature and at voltages somewhat above 6 volts, e. g. about 7.5 volts for not less than about 3 minutes, followed by treatment at 3 volts for about 3 more minutes. This reduced voltage treatment is not essential but it forms a reddish brown film over the nickel surface where it is in condition to receive an adherent deposit, and this constitutes a convenient visual indicator to show that the preparation of the surface has been accomplished. After this treatment the surface is then rinsed and is ready for the electrodeposition of the nickel weld metal. This method of preparing the surface, especially in the presence of solder, for receiving a strongly adherent electrodeposit, is the invention of only one of the present inventors herein, but is the subject not specifically claimed herein, but is the subject of a copending concurrently filed application Serial No. 639,870, now Patent No. 2,533,533.

If electrolytically formed sheets are being welded, the electrodeposition of the nickel weld metal is advantageously carried out under as nearly as possible the same conditions as was the electroformation of the sheets, so as to yield an electrolytic deposit of substantially the same properties as the sheets joined thereby. If other than electrolytic sheets are being joined, the conditions of deposition are advantageously chosen to yield a deposit of strength (or other desired property) as nearly as possible like that of the sheets being joined. Otherwise there is no particular restriction on the electrodeposition of the weld metal. Customary nickel anodes are used. In most cases, except when joining sheets electro-formed from solutions of other types, a Watts type bath or some modification thereof is used.

Particularly in cases where the parts 11 and 12 are large in extent, it has often been found convenient, instead of painting relatively large areas with stop-off compound and immersing large parts in the electrolytic baths, to form an electrolytic cell around the trough 23 which is to be filled with weld metal. Such a device is illustrated in Fig. 3. The electrolytic cell, designated generally by the numeral 30, is formed around the trough 23 which has been provided for receiving the weld metal as hereinbefore described. Instead of using stop-off varnish, a gasket 31 of rubber of other suitable material, having an opening slightly wider than the trough 23, is cemented around this trough by any suitable cement such as one of chlorinated rubber or the like. The walls 32 of cell 30 may be made of any suitable non-conducting material which will not be damaged by the solutions used. For use in the electrolytic welding of nickel, and most of the usual metals as well, we find laminated phenol formaldehyde resin to be a satisfactory material. The surface to be welded is advantageously though not necessarily, placed on the side as shown in Fig. 3, rather than on the bottom of the electrolytic cell. In order to expose this surface to the bath, one of the walls 32 is provided with a window 33 corresponding in size and shape to the trough 23. The edges of this window are advantageously bevelled as at 34 so that the wall overhangs the surface to be plated, shielding the edges to prevent an undue thickening or "treeing" of the deposit at the edges of the area to be plated. An inlet is provided at one end of the cell and an outlet at the opposite end, so that the various solutions used may be readily introduced into and removed from cell 30, and so that a current of the electrolytic solution may be maintained through the cell from a suitable reservoir to furnish agitation, etc. when desired. The inlet 35 is advantageously placed, as shown, at the level of the window 33 so that the incoming solution may be caused to sweep across the area to be plated. An outlet 36 is advantageously located in the bottom of the cell so that solution and sediment may be completely flushed out of the cell. The surface 21—24—22 constitutes one electrode and another electrode 37 is provided to complete the cell. These electrodes may be connected by means of conductors 38 and 39 to a suitable direct current source provided with the necessary controls in a manner well understood in the electroplating art. The cell as thus described will serve for the electrolytic cleaning and preparing operations as well as the electroplating operation itself by substituting the proper electrolytic solutions and the proper electrodes 37 and by suitably controlling the strength and direction of the current used.

When the electrodeposition has continued until the surface of the deposit is everywhere above the surface of the sheets 11, 12, the electrolyte is drained from the cell 30 and it and gasket 31 are removed leaving the welded joint as shown in Fig. 4. If, as is usual, it is desired to have the finished joint of the same thickness as the sheets themselves, the weld metal 26 may advantageously be mechanically dressed down to the level of the surrounding surfaces, as indicated by the broken line in Fig. 4, while the parts are still held firmly on block or bar 41. The welded structure 11—26—12 is then removed from the block 14 in a manner appropriate to the method of attachment used, as by fusing the solder or other cementing medium. The welded structure is then turned over and the flat dressed surface is fastened to the flat surface of a block or bar 27, preferably using the same fastening method as used to fasten sheets 11, 12 to the block or bar 14, the block and welded joint then appearing as shown in Fig. 5. The bent edges 15, 16 of the sheets 11 and 12, the solder or other conductive filling 24, and as much of the weld metal 26 as extends above the plane of the now upper surfaces of sheets 11, 12 (indicated by the broken line in Fig. 5) are then mechanically removed in the operation of dressing the weld down to the plane of said surfaces. The welded sheet is then removed from block 27, and the solder or other cementing medium is cleaned from its surface. The sheets 11 and 12 together with the weld metal 26 now form a single substantially homogeneous sheet as shown in Fig. 6, having substantially uniform strength, hardness, etc. throughout the weld metal, the adjacent metal of the sheets and the bond between them. If the surface of the weld 26 and the adjacent surfaces of sheets 11 and 12 are then polished or given any other desired surface finish, the presence of the weld can be detected only by careful examination. In the drawing where the weld metal 26 and the parts 11 and 12 joined thereby are shown in section, the section lining of the weld metal is in a different direction from that of the welded parts in order to distinguish between weld metal and base metal. No lines have been drawn, however, to indicate the interfaces which separate the weld metal from the welded parts because the welded structure is substantially homogeneous throughout and such lines would be misleading if present in the drawing. These interfaces appear in the drawing as the juncture of oppositely inclined cross hatching and in the welded structure are clear cut, lacking the characteristic zone of intermixture of weld metal and base metal which is normally present to a greater or lesser degree in fusion welds.

In order to secure flatness, freedom from distortion, and from undue stress in the welded structure, especial precautions should be taken in soldering or cementing the parts to be welded onto the block or bar 14. If the parts are heated in this operation, care should be taken that the temperature difference per unit distance through the metal be kept well below that which would permanently distort the metal. The parts should also be heated uniformly for a distance back from the edges 15, 16 sufficiently greater than the width of bar 14 that the entire area soldered to said bar will be expanded uniformly in all directions and the edges 15, 16 will remain straight. Care should also be exercised not to oppose any effective external resistance to the uniform and free thermal expansion of the parts 11 and 12 in the soldering or cementing operation. Further, the material of the bar 14 should be chosen with due regard to its coefficient of thermal expansion so that unequal contraction on cooling does not deleteriously stress or deform the parts 11 and 12. In this connection it should be noted that the usual tendency of the electrodeposited weld metal to shrink after deposition can be largely compensated by selecting a suitable material for bar 14 and a cementing medium of suitable melting point so that on cooling the parts 11 and 12 are held under a slight tension during deposition of weld metal 26.

It is possible when sheets of high strength electrolytically formed nickel are joined by nickel weld metal electrolytically deposited in the manner hereinbefore described, to produce a welded sheet metal structure which possesses in the original sheets clear up to the weld, in the joint between base metal and weld metal, in the weld metal itself, and completely across the welded joint, an ultimate strength in tension which everywhere exceeds 80,000 pounds per square inch. This high strength is believed due to several factors. The uniform strength of the original sheets up to the line of the weld, in contrast to the zone of weakness frequently found in the metal adjacent to fusion welds, is due to the avoidance in the present process, of the high temperatures used in fusion welding which commonly, unless special precautions are taken, leave residual shrinkage stresses in the metal adjacent the weld. The strength of adhesion of the weld metal to the base metal is due largely to the care with which the base metal was prepared for the reception of the electrodeposit and, in the case of nickel, to the preparation procedure described. The strength of the weld metal itself is due first to use of the known techniques by which metal of high strength can be electrodeposited, and second to the formation of the trough 23 for the reception of the weld metal, as described, so that it has gently sloping sides and a smooth, continuous, uninterrupted, electrically conducting surface throughout its entire extent, including the filling 24 between the ends of the sheets being welded. Due to the resulting substantially uniform rate of deposition over the entire area of the trough 23, the orientation of the microstructure of the deposit exhibits a freedom from discontinuities such as are caused by breaks in the continuity of the conducting surface on which the deposit was made, or by the meeting of deposits which have been built up in different directions. Any such discontinuities or sudden changes in the orientation of the microstructure can be detected either by metallographic examination of the microstructure or by the weakness of the electrodeposit which is always found at such discontinuities.

Although the invention has been described as embodied in the joining of nickel parts, its use is not limited thereto as almost any of the usual metals can be welded in the manner described, provided the electrolytic preparation process is chosen to suit the metal being welded and a suitable weld metal is used. It has particular value in joining parts formed of iron, nickel, cobalt, or alloys containing material proportions of one or more of these metals. It is ordinarily desirable that the weld metal be of the same composition as the parts to be welded. However, if they are made of metals which cannot be conveniently electrodeposited, it is often possible to make the weld with an electrodepositable metal having properties sufficiently similar to those of the base metal to form a satisfactory weld. For example, nickel may on occasion form a satisfactory weld in monel metal or stainless steel if these metals have been suitably prepared for its reception.

The term "metal" as used in the present specification and claims, includes alloys as well as elementary metals. It is to be understood as applying only to those metals which would be commercially recognized as such, i. e. those which possess the physical properties commonly associated with metals and as excluding substances which are metals only in a chemical sense.

By the term "nickel" it is not meant to restrict the composition to chemically or even commercially pure nickel, since various impurities or alloying elements may be present, sometimes to a considerable extent without impairing the usefulness of the device. The use of cobalt as an alloying element is, it has been found, frequently advantageous in facilitating the electrodeposition. Nickel parts or welds are therefore to be understood as parts or welds which are composed largely of nickel or which owe their physical characteristics largely to this metal.

The term "interface" as used in the present specification and claims, designates the surface of contact between weld metal and base metal, and distinguishes from zones of greater or lesser thickness wherein weld metal and base metal are intermixed, such as are commonly found to lie between the weld metal and the base metal in fusion welds. It is not to be understood, however, to imply the complete absence of any alloying of base metal and weld metal such is sometimes believed to exist in some degree where one metal is electrolytically deposited on another.

It is immaterial to the successful operation of the present process whether the parts to be welded are parts of discrete pieces or parts of the same piece. The process can be utilized without material change for patching slits, cracks, and holes in metal parts. In such cases the edges to be joined may be bent down as described or, if bending is impracticable, the trough or depression for receiving the weld metal may be formed by bevelling the edges, so long as the electrical conductor joining the edges to be welded is wholly without the plane of the parts to be welded and the composite surface on which the weld metal is to be deposited is smooth and free from all pits, holes, cracks, or other discontinuities and irregularities.

The process has particular utility for joining the ends of metallic strips to form endless bands or belts in cases where the joint must be practically indistinguishable from the adjacent portions of the belt. It will be understood, however, that the invention is not limited to such uses but may be advantageously employed for many purposes where a strong bond is required and particularly where the metal parts to be joined are liable to have their physical properties adversely affected by the temperatures required for the customary process of welding, brazing, hard soldering, or the like.

The bond between weld metal and base metal is herein, for want of a better and more specific term, called an "electrolytic bond." The exact nature of the bond, however, the molecular or crystal relationships, and the adhesive or cohesive forces, involved at the interface between weld metal and base metal, are not understood. Nevertheless the bond when properly made as described appears to have substantially the strength of the metal itself, it having been found impossible, in testing such welded structures to destruction, to break them apart at the bond.

We claim:

1. Electrolytic method of welding together edges of sheet metal, which comprises: placing the edges to be joined in proximate relation and holding them firmly, throughout the length to be joined, in the relative positions they are to occupy after welding; forming a trough for the reception of weld metal and filling the space between said edges with an electrical conductor, in such manner that said electrical conductor forms the bottom of said trough and lies completely outside the plane of the sheets, and said trough has a width much greater than its depth, gently sloping sides and a smooth continuous uninterrupted electrically conducting surface throughout its extent; preparing the surface of said trough so that metal electrolytically deposited thereon will be strongly adherent to the surfaces to be joined; then electrolytically depositing weld metal in said trough until it has at least reached the level of the upper surface of the adjacent metal sheet.

2. Electrolytic method of welding together edges of sheet metal, which comprises: forming a trough which is wide relative to its depth for the reception of weld metal by bending the sheets slightly at a distance from the edges to be welded so that said edges are completely displaced from the plane of the sheets, and filling the space between said edges with an electrical conductor lying completely outside the plane of the sheets; imparting to the trough a smooth, continuous, uninterrupted, electrically conducting surface throughout its extent; holding the sheets throughout the length of the edges to be joined, from the edges back beyond the bends, in the relative positions they are to occupy after welding; preparing the surface of the metal in said trough so that metal electrolytically deposited thereon will be strongly adherent to the bent-down surfaces of said sheets forming a part of said trough; then electrolytically depositing weld metal in said trough until it has at least reached the level of the upper surface of the unbent portions of the sheets.

3. Electrolytic method of welding together edges of sheet metal, which comprises: cementing the sheets, throughout the length to be welded, under pressure sufficient to press the sheets flat onto a support, for a distance back from each of said edges, onto a more rigid member with an interposed reticular member; filling the space between said edges with an electrical conductor lying completely outside the plane of the sheets, to form, together with the surfaces to be joined, a trough which is wide relative to its depth for the reception of weld metal, said trough having sloping sides and a smooth continuous uninterrupted electrically conducting surface throughout its extent; preparing the surface of said trough so that metal electrolytically deposited thereon will be strongly adherent to said surfaces to be joined; then electrolytically depositing weld metal in said trough until it has at least reached the level of the upper surface of the adjacent metal sheet.

4. Electrolytic method of welding together edges of sheet metal, which comprises: bending the sheets slightly at a distance from the edges to be welded so that said edges are completely displaced from the plane of the sheets; cementing the sheets, throughout the length to be welded, under pressure sufficient to flatten the sheets onto a support, from said edges back beyond said bends, onto a more rigid member, with an interposed reticular member; filling the space between said edges with an electrical conductor lying completely outside the plane of the sheets, to form, together with the bent-down surfaces of the sheets, a trough which is wide relative to its depth for reception of weld metal, said trough having a smooth continuous uninterrupted electrically conducting surface throughout its extent; preparing the surface of said trough so that metal electrolytically deposited thereon will be strongly adherent to the bent-down surfaces of said sheets forming a part of said trough; then electrolytically depositing weld metal in said trough until it has at least reached the level of the upper surface of the adjacent metal sheet.

5. Electrolytic method of welding together edges of electrolytically formed sheet metal, which comprises: placing the edges to be joined in proximate relation and holding them firmly, throughout the length to be joined, in the relative positions they are to occupy after welding; forming a trough for the reception of weld metal and filling the space between said edges with an electrical conductor, in such manner that said electrical conductor forms the bottom of said trough and lies completely outside the plane of the sheets, and said trough has a width much greater than its depth, gently sloping sides and a smooth continuous uninterrupted electrically conducting surface throughout its extent; preparing the surface of said trough so that metal electrolytically deposited thereon will be strongly adherent to the surfaces to be joined; then electrolytically depositing weld metal of substantially the same composition as the metal of the sheets, in said trough until it has at least reached the level of the adjacent surface of said sheet metal, said deposition of weld metal being carried out in a solution and under conditions substantially the same as those used in the electroformation of the sheets being welded.

6. Electrolytic method of welding together edges of sheet nickel, which comprises: cementing the sheets firmly throughout the length of edge to be welded, for a distance back from said edges, onto a more rigid member; filling the space between said edges with an electrical conductor lying completely outside the plane of the sheets, to form, together with the surfaces to be joined, a trough for the reception of weld metal, said trough having a width much greater than its depth, gently sloping sides and a smooth continuous uninterrupted electrically conducting surface throughout its extent; preparing said surface so that nickel electrolytically deposited thereon will be strongly adherent to said surfaces to be joined, by anodic treatment in a concentrated solution of sulphuric and phosphoric acids; then electrolytically depositing nickel in said trough until it has at least reached the level of the upper surface of the adjacent metal sheet; and controlling the conditions of said electrolytic deposition to yield a deposit having strength substantially equal to that of the sheets being joined.

7. Electrolytic method of welding together edges of electrolytically formed sheet nickel, which comprises: bending the sheets slightly at a distance from the edges to be welded so that said edges are completely displaced from the plane of the sheets; cementing the sheets, under pressure sufficient to flatten the sheets onto a support, from said edges to a point beyond said bends, onto a more rigid member, with an interposed reticular member; filling the space between said edges with an electrical conductor lying completely outside the plane of the sheets, to form, together with the bent-down surfaces of the sheets, a trough for reception of weld metal, said trough having a width much greater than its depth, gently sloping sides and a smooth continuous uninterrupted electrically conducting surface throughout its extent; treating the surface anodically in a concentrated solution of sulphuric and phosphoric acids; then electrolytically depositing nickel in said trough from a solution and under conditions substantially the same as those used in electroforming the sheets being welded.

8. Electrolytic method of welding together edges of sheet metal, which comprises: cementing the sheets firmly throughout the length of edge to be welded and for some distance back from said edges, onto a more rigid member; filling the space between said edges with an electrical conductor lying completely outside the plane of the sheets, to form, together with the surfaces to be joined, a trough for the reception of weld metal, said trough having a width much greater than its depth, gently sloping sides and a smooth continuous uninterrupted electrically conducting surface throughout its extent; preparing said surface so that metal electrodeposited thereon will be strongly adherent to said surfaces to be joined; electrolytically depositing weld metal in said trough, until it has everywhere reached the level of the upper surface of said sheets; mechanically dressing down the surface of the weld metal to the level of the adjacent surfaces of the sheets; removing the welded structure from said more rigid member; cementing the freshly dressed surface of the weld to the conforming surface of a more rigid member; and mechanically dressing down the other side of the weld to the level of the adjacent surfaces of that side of the sheets.

9. Electrolytic method of welding together edges of sheet metal, which comprises: firmly cementing the sheets, throughout the length of edge to be welded, for some distance back from said edges, onto a more rigid member; filling the space between said edges with an electrical conductor lying completely outside the plane of the sheets, to form, together with the surfaces to be joined, a trough with gently sloping sides for the reception of weld metal; forming an electrolytic cell around and enclosing said trough, so that the surface of said trough forms one electrode said cell; electrolytically preparing the surface of said trough so that metal electrolytically deposited thereon will be strongly adherent to the metal of the sheets where exposed therein; electrolytically depositing weld metal in said trough to at least the thickness of the sheets being welded; and removing the solution from the cell and the cell from the welded joint.

10. Electrolytic method of welding together edges of sheet metal, which comprises: bending the sheets slightly at a distance from the edges to be welded so that said edges are completely displaced from the plane of the sheets; soldering the sheets, under pressure sufficient to flatten the sheets onto a support, from said edges to a point beyond said bends, onto a more rigid member, with an interposed reticular member; filling the space between said edges with an electrical conductor lying completely outside the plane of the sheets, to form, together with the bent-down surfaces of the sheets, a trough for reception of weld metal; preparing the surface of said trough so that metal electrolytically deposited thereon will be strongly adherent to the metal of the sheets where exposed therein; electrolytically depositing weld metal in said trough to at least the thickness of the sheets being welded; mechanically dressing down the surface of the weld metal to the level of the adjacent surfaces of the sheets; unsoldering the welded joint from the rigid member; soldering the freshly dressed surface under pressure and with an interposed reticular member to a flat surface of a more rigid member; then mechanically dressing down the other surface of the welded joint, removing as much of the metal of the original sheets as was bent out of the plane of the sheets in preparation for making the weld.

11. Electrolytic method of welding together edges of sheets of nickel, which comprises: placing the edges to be joined in proximate relation and holding them firmly, throughout the length to be joined, in the relative positions they are to occupy after welding; forming a trough for the reception of weld metal; giving to said trough gently sloping sides and a width much greater than its depth; filling the space between said edges with material lying completely outside of the plane of the sheets and forming the bottom of said trough; imparting to said trough a smooth continuous uninterrupted electrically conducting surface throughout its extent; preparing the surface of said trough so that metal electrolytically deposited thereon will be strongly adherent to the surfaces to be joined; then electrolytically depositing nickel in said trough until the deposit is at least as thick as the sheets being joined.

12. Method according to claim 1 wherein the sheets to be welded are composed of a metal chosen from the class of nickel, iron, cobalt and alloys the major proportion of which is composed of at least one of said metals, and whereposed in the weld metal is chosen from the same class.

13. A welded sheet metal structure comprising two parts of sheet metal which are themselves not in direct contact with each other, and a continuous, homogeneous body of feld metal which joins said parts together and forms, together therewith, a continuous integral sheet, characterized by the presence of interfaces where the weld metal is in contact with and strongly adherent to the metal of said two parts, respectively, which interfaces are slightly and oppositely inclined to the surface of, and extend completely and with continuity through said sheet, said weld metal having a metallographic structure which is characteristic of metal built up by electrolytic deposition on said interfaces, the transition in the orientation of the metallographic structure of the weld metal, from that characteristic of a portion deposited on one of said inclined interfaces to that characteristic of a portion deposited on said oppositely inclined interface being gradual and substantially free from discontinuities.

14. The welded sheet metal structure of claim 13 wherein the original surfaces of the welded parts are bent slightly in opposite directions and extend completely through the welded sheet, at the weld, where they constitute the interfaces along which the weld metal is in contact with the metal of the welded parts.

15. The welded sheet metal structure of claim 13 wherein the metallographic structure of the sheet metal parts is characteristic of metal electrolytically deposited on a surface parallel to the surface of said parts; and wherein the original surfaces of said parts are bent slightly in opposite directions and extend completely through the welded sheet, at the weld, where they constitute the interfaces along which the weld metal is in contact with the metal of the welded parts; and wherein, along each of said interfaces, the metallographic structure of the weld metal and that of the welded part are inclined to same degree which is substantially equal to the degree of inclination of said interfaces.

16. The welded structure of claim 13 wherein the welded parts and weld metal are each chosen from the class consisting of nickel, iron, cobalt, and alloys the major portion of which is composed of at least one of said metals.

17. The welded structure of claim 13 wherein the welded parts and the weld metal are nickel and the structure has, at all parts, an ultimate strength in tension of at least 80,000 pounds per square inch.

DONALD B. BRADNER.
WILLIAM B. STODDARD, JR.
PHILIP S. BLICKENSDERFER.

REFERENCES CITED

The following references are of record in the file of this patent:

UNITED STATES PATENTS

| Number | Name | Date |
|---|---|---|
| 704,400 | Taluau | July 8, 1902 |
| 901,115 | Metten | Oct. 13, 1908 |
| 1,555,840 | Hanley | Oct. 6, 1925 |
| 1,674,941 | Bart | June 26, 1928 |
| 1,710,258 | Hume | Apr. 23, 1929 |
| 1,790,738 | Andren | Feb. 3, 1931 |
| 1,906,376 | Holmes | May 2, 1933 |
| 1,956,233 | Braun | Apr. 24, 1934 |
| 2,324,335 | Taylor | July 13, 1943 |
| 2,333,567 | Helmore | Nov. 2, 1943 |
| 2,334,699 | Faust | Nov. 23, 1943 |
| 2,371,823 | Jackson | Mar. 20, 1945 |

FOREIGN PATENTS

| Number | Country | Date |
|---|---|---|
| 6,061 | Great Britain | of 1904 |
| 258,694 | Italy | of 1928 |
| 359,386 | France | of 1906 |
| 61,411 | Sweden | of 1925 |

Certificate of Correction

Patent No. 2,569,368 September 25, 1951

DONALD B. BRADNER ET AL.

It is hereby certified that error appears in the printed specification of the above numbered patent requiring correction as follows:

Column 4, line 50, for "rubber of" read *rubber or*; lines 63 and 64, for "evpose" read *expose*; column 5, line 81, for "bar 41" read *bar 14*; column 11, line 67, for "feld metal" read *weld metal*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*